(12) United States Patent
Gunderson et al.

(10) Patent No.: US 7,314,128 B2
(45) Date of Patent: Jan. 1, 2008

(54) CLUTCH CONTROL REGULATOR VALVE WITH END OF FILL DETECTION

(75) Inventors: Joel H. Gunderson, Canton, MI (US); Steven P. Moorman, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 202 days.

(21) Appl. No.: 11/218,372

(22) Filed: Sep. 2, 2005

(65) Prior Publication Data

US 2007/0051580 A1 Mar. 8, 2007

(51) Int. Cl.
*F16D 25/0638* (2006.01)
*F16D 25/12* (2006.01)

(52) U.S. Cl. .................. 192/85 AA; 192/85 R; 192/109 F

(58) Field of Classification Search .......... None
See application file for complete search history.

(56) References Cited

U.S. PATENT DOCUMENTS 5,853,076 A * 12/1998 McKee et al. ........... 192/87.14
6,499,577 B2 * 12/2002 Kitamoto et al. ......... 192/85 R

* cited by examiner

*Primary Examiner*—Rodney H. Bonck

(57) ABSTRACT

A torque-transmitting regulating system employs a valve mechanism, which distributes fluid pressure from a pressure source to a torque-transmitting mechanism by control for the engagement and disengagement thereof. The valve mechanism has associated therewith a pressure sensor mechanism, which distributes a control signal to the electronic control module (ECM) to inform the ECM of the condition of operation of the torque-transmitting mechanism. A valve mechanism supplies a first pressure signal during disengagement of the torque-transmitting mechanism, a second pressure signal during the filling period of the torque-transmitting mechanism, and a third signal during the fully engaged condition of the torque-transmitting mechanism.

10 Claims, 5 Drawing Sheets

CLUTCH CONTROL REGULATOR VALVE WITH END OF FILL DETECTION

TECHNICAL FIELD

This invention relates to pressure fill control valves and, more particularly, to pressure and fill control valves in automatic transmissions.

BACKGROUND OF THE INVENTION

Automatic shifting power transmissions normally include a plurality of shift control valves which supply pressure to and from the apply chamber of a transmission clutch piston. The valves are connected with a pressure source and with a control signal source. The control signal source will open the valve to begin clutch fill and the valve will fully open to permit fluid flow to the piston chamber. The fluid within the piston chamber will initially compress the clutch return spring which will apply one reaction to the clutch pressure, and after contacting the clutch plate the clutch pressure will increase rapidly and the control valve will begin a regulation process during which the pressure within the clutch is maintained at a desired level generally less than full system pressure.

SUMMARY OF THE INVENTION

It is an object of the present invention to provide an improved clutch regulator valve.

In one aspect of the present invention, the clutch regulator valve supplies fluid pressure from a pressure source to a clutch apply chamber in response to a control signal.

In another aspect of the present invention, the regulator valve has connected therewith a pressure sensor, which provides a feedback function to an electronic control module (ECM), which is providing the signal pressure.

In still another aspect of the present invention, during a first portion of clutch operation in which the clutch apply chamber is initially filled with fluid and reacted against by the spring, the pressure sensor is exhausted, thereby sending a first signal to the electronic control module.

In yet another aspect of the present invention, the pressure within the clutch chamber rises significantly upon completion of the spring compression and initial engagement of the clutch plates by the clutch piston and the fluid pressure in the pressure sensor rises accordingly, thereby signaling that the clutch chamber is filled and clutch engagement is beginning.

In a further aspect of the present invention, during the clutch filling operation, a signal is sent from the regulator valve to the pressure sensor to signify one level of pressure at that device, thereby signaling that the filling of the clutch chamber has begun.

In yet a further aspect of the present invention, the clutch control valve assumes the regulating position wherein the pressure within the fill circuit is detected by the pressure sensor at a level less than the pressure level during clutch fill.

DESCRIPTION OF THE EXEMPLARY EMBODIMENTS

Figure 1:
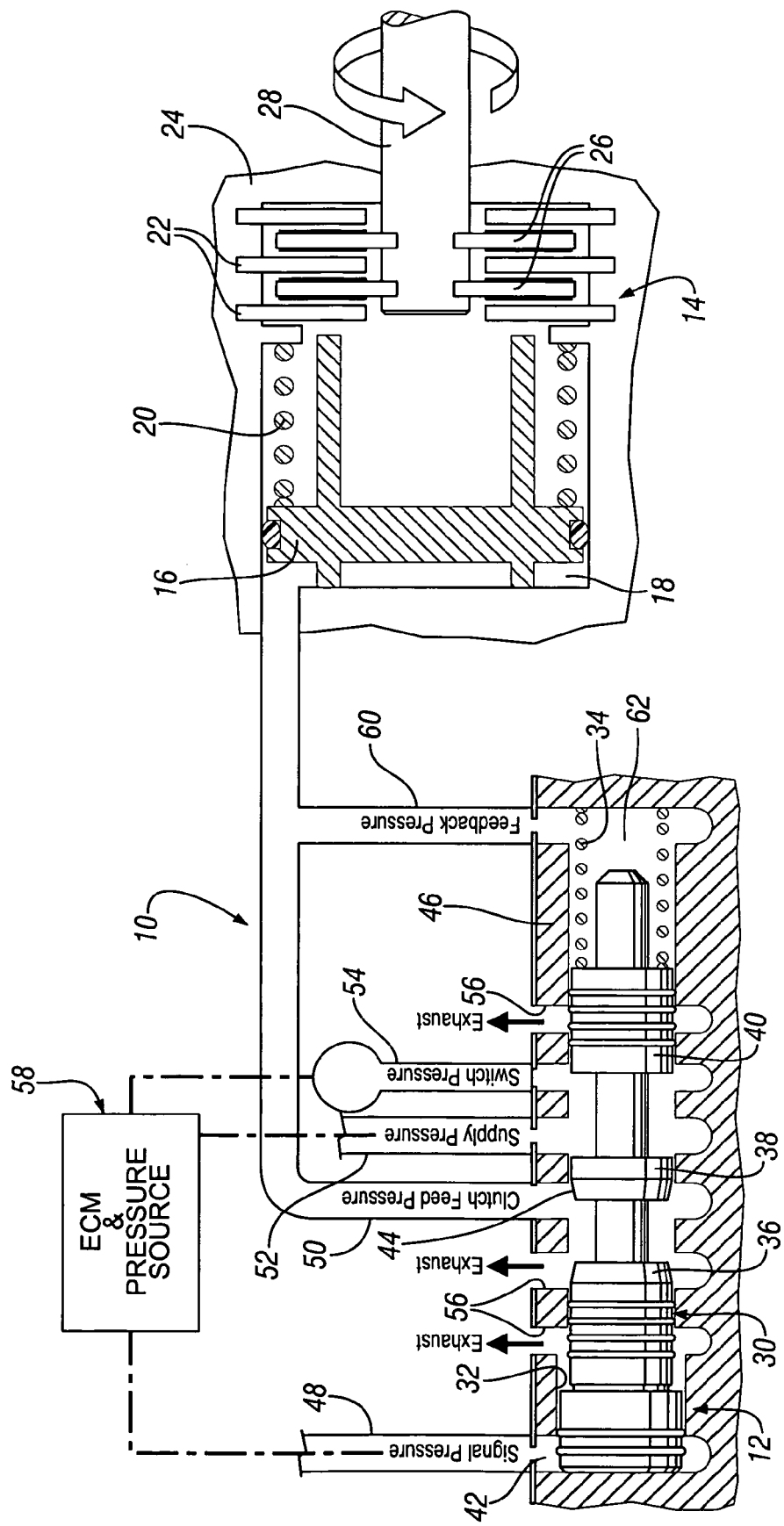
FIG. 1 is a diagrammatic representation of a clutch control apparatus having a regulator valve and a conventional torque-transmitting mechanism.

Referring to the drawings, wherein like characters represent the same or corresponding parts throughout the several views, there is seen in FIG. 1 a torque-transmitting regulating and control system 10 having a regulator valve 12, and a torque-transmitting mechanism 14. The torque-transmitting mechanism 14 includes an apply piston 16 slidably disposed in an apply chamber 18 and urged in one direction by a return spring 20. The torque-transmitting mechanism 14 also includes a plurality of friction plates 22 drivingly connected with a housing 24 and a plurality of interdigitated plates 26 drivingly connected with-a shaft member 28.

The regulator valve 12 includes a valve spool 30 slidably disposed in a valve bore 32 and urged leftward within the valve bore 32 by a return spring 34. The valve spool 30 has three equal diameter lands 36, 38, and 40 and a large diameter land 42, which may be either integral with the lands 36, 38, and 40 or separate as a valve plug. The valve land 38 is central of the valve lands 36 and 40 and has a tapered surface 44.

The valve bore 32 is a part of a valve body 46, which has a control signal passage 48, a clutch feed passage 50, a supply passage 52, a pressure switch or sensor control passage 54, and a plurality of exhaust passages 56. The signal passage 48 is in communication with a conventional electronic control module (ECM) 58, which includes a pressure source and a preprogrammable digital computer. These are well-known devices used in the control of power transmissions.

The clutch feed passage 50 is communicating with the torque-transmitting apply chamber 18. The supply passage 52 communicates with the electronic control module 58 as does the pressure sensor passage 54. A feedback passage 60 communicates with a chamber 62 in which the spring 34 is disposed. The feedback passage 60 also communicates with the clutch feed passage 50. Thus, the pressure in the chamber 62 is equal to the pressure in chamber 18.

The condition of the torque-transmitting mechanism 14 in FIG. 1 is in a disengaged state such that the fluid pressure in the chamber 18 is essentially zero. However, a slight pressure such as two or three psi may be contained within the chamber to ensure that the passages remain filled when the clutch is disengaged. It should also be noted that in the inactive or disengaged state, the supply passage 52 communicates with the pressure switch passage 54 such that a signal equal to the fill supply pressure is transmitted through the ECM 58 to signify that the clutch system is disengaged.

Figure 2:
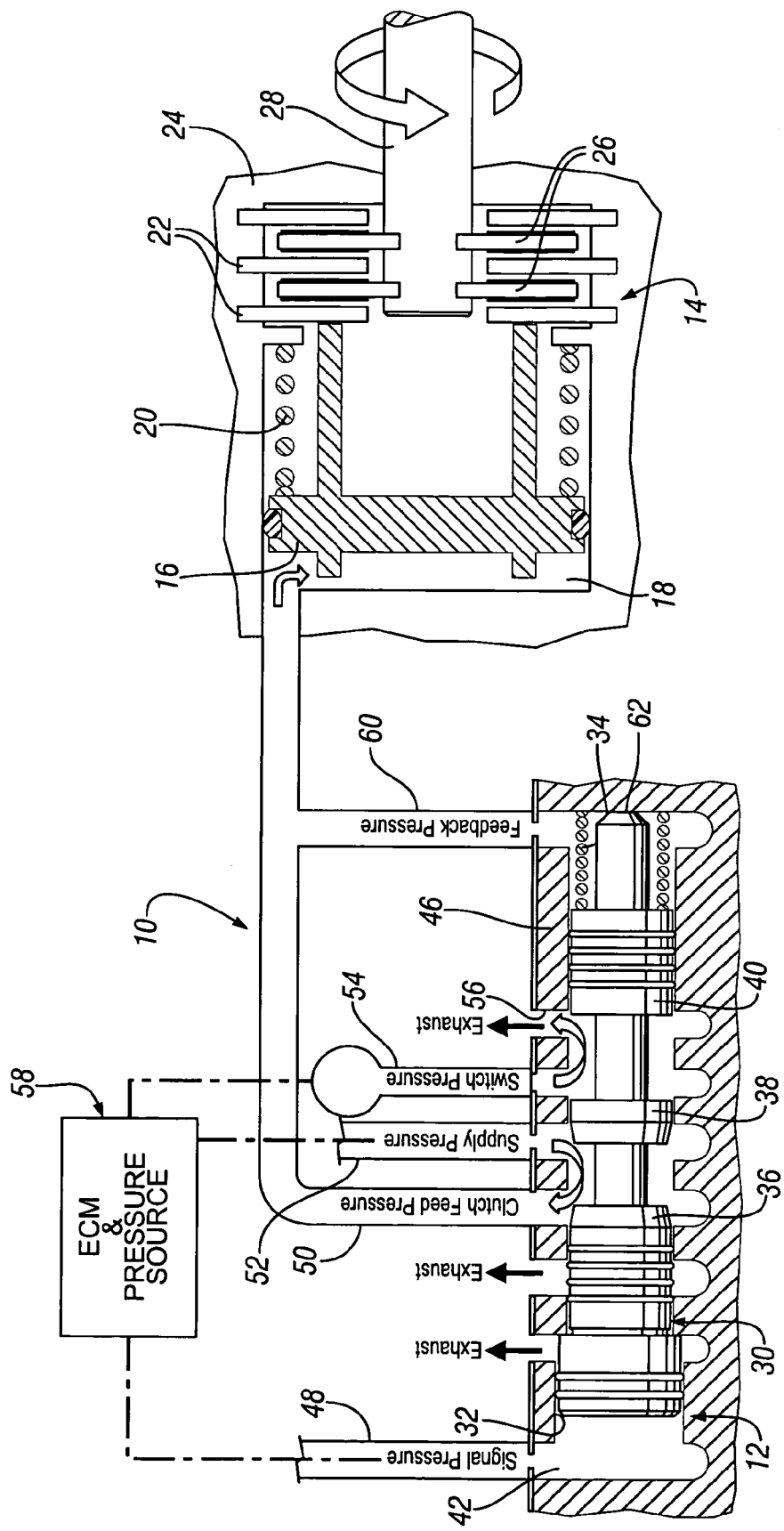
FIG. 2 is a view similar to FIG. 1 wherein the operation of the clutch engagement has begun.

In FIG. 2 a control signal has been issued to the passage 48, which will operate on the end of the land 42, thereby urging the valve spool 30 rightward against the spring 34. The valve land 42 has an area A1 and the land 40 has a feedback land equal to area A2. When the valve spool 30 is moved fully to the right against the spring 34, fluid in the supply passage 52 is transmitted fully to the clutch feed passage 50 and the pressure sensor passage 54 is connected with the exhaust passage 56. At this point, fluid pressure is distributed from the valve 12 to the apply chamber 18 and the piston 16 begins to move rightward against the return spring 20, which will produce a build up of pressure within the feedback passage 60.

In the fill process at chamber 18, the pressure within the feedback passage 60 is not sufficient to overcome the pressure within the passage 48 acting on the area A1 of land 42. It is noted that during this process that the pressure within the sensor pressure passage 54 is connected with exhaust and a low pressure signal occurs at the ECM 58 signifying that the fill of the chamber 18 has begun.

Figure 3:
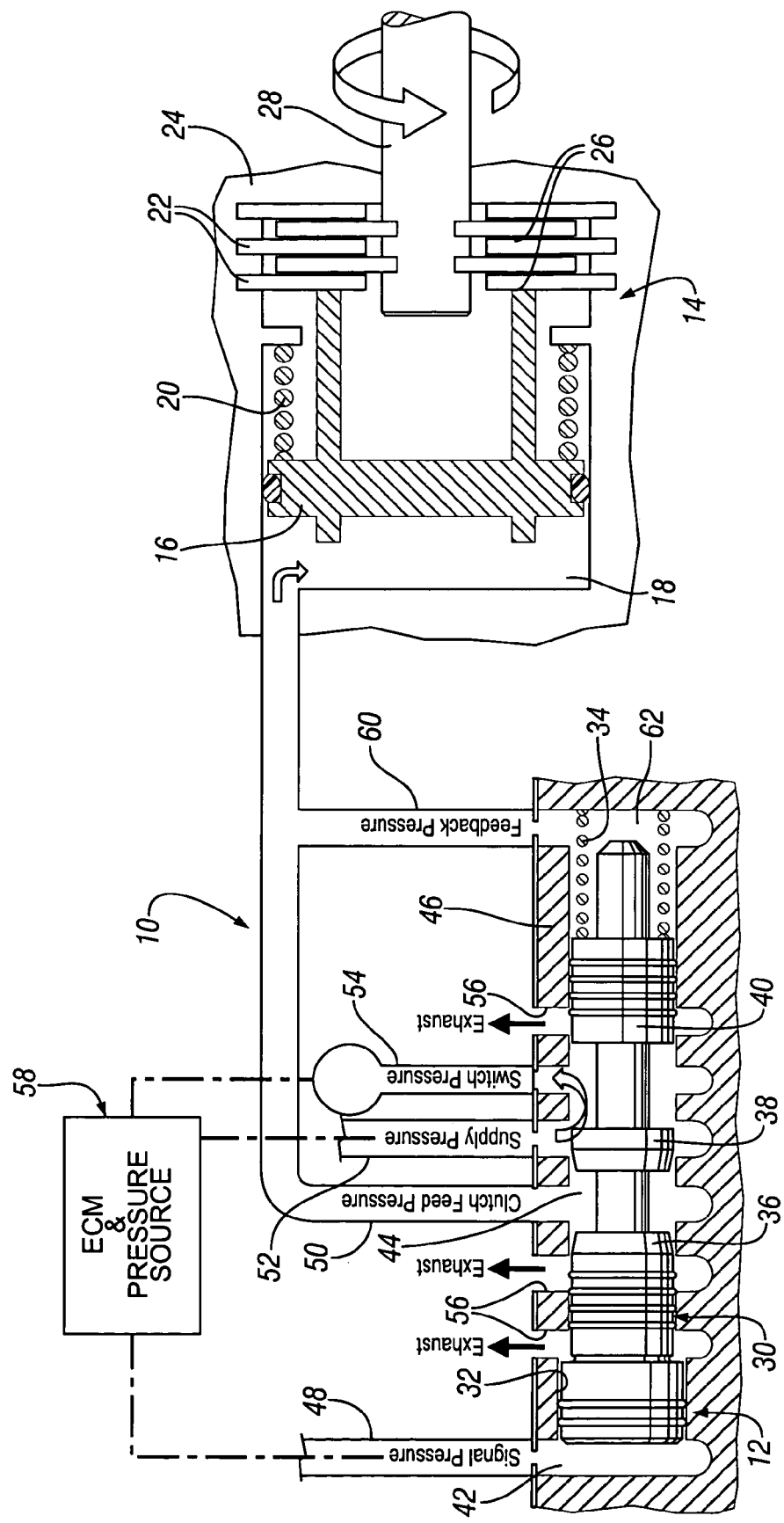
FIG. 3 is a view similar to FIG. 2 wherein the operation of the clutch is completed.

In FIG. 3, the fluid within the chamber 18 has moved the piston 16 against the friction plate 22 such that increased pressure is present in the passage 50, thereby increasing the pressure in feedback passage 60 and the pressure acting on the area A2 of valve spool 30. When this occurs, the pressure in passage 48 acting on area A1 of valve land 42 will be balanced by the increased pressure in the feedback passage 60 such that the valve spool 30 will assume a regulating position. The pressure in the supply passage 52 is distributed to pressure in the sensor pressure passage 54 and, at a controlled rate, to the clutch feed passage 50. The pressure in the clutch feed passage 50 increases and the pressure in the sensor passage 54 also increases. The increased pressure in the passage 54 is transmitted to the ECM 58 such that the control module will be alerted that the end of fill has occurred and clutch engagement is beginning.

At full engagement, the valve 12 will regulate the pressure within the chamber 18 to maintain the clutch engaged at the desired torque level and the pressure in passage 54 (switch state is the same whether clutch engagement is being maintained or is off) remain at the supply pressure level.

Figure 4:
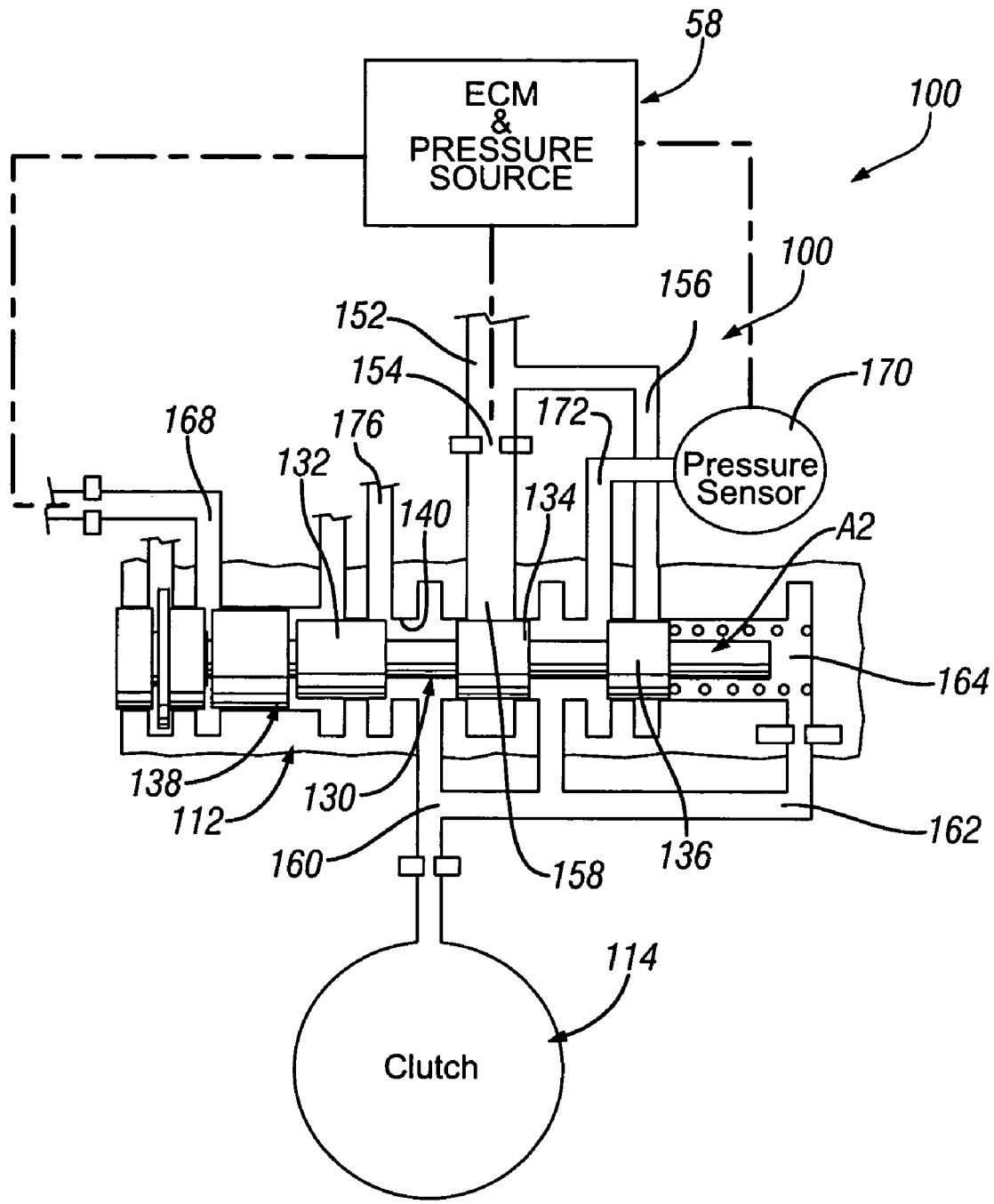
FIG. 4 is a diagrammatic representation of an alternative embodiment showing the clutch control system in the disengaged condition.

A torque transmitter regulating system and control 100 includes a torque-transmitting mechanism 114 and the ECM and pressure control source 58, as shown in FIG. 4. A control valve 112 has a valve spool 130 which includes a plurality of equal diameter lands 132, 134, and 136 and a large diameter land 138, which may be either integral with the land 132 or formed as a separate plug valve. The valve spool 130 is slidably disposed in a valve bore 140, which has connected therewith a plurality of passages including a supply passage 152, which is communicated through a restriction 154 with the valve bore 140 and unrestricted through a passage 156 with the valve bore 140 in the area of the valve land 136. The pressure in passage 152 is distributed through the restriction 154 through a clutch supply passage 158 in the area of the valve land 134.

The valve bore 140 is also in communication with a clutch feed passage 160. Fluid in the clutch feed passage 160 is distributed through a feedback passage 162 to a feedback chamber 164, which acts on the valve land 136 having an area of A2. The valve land 138 is slidably disposed in the valve bore 140 and communicates with a clutch engaging signal passage 168, which is distributed thereto from the ECM 58. A pressure sensor 170 communicates with the valve bore 140 through a passage 172 between the lands 136 and 134.

The valve 112 shown in FIG. 4 is in the clutch disengaged or off position such that the fill pressure within the torque-transmitting mechanism 114 is connected with an exhaust passage 176. This exhaust passage 176 may have a slight pressure maintained therein to ensure that the passage 160 is filled with fluid at all times. However, it is not sufficient to overcome the clutch return spring or even provide any significant pressure within the feedback passage 162. At this point, the pressure in passage 172 is equal to the pressure in the clutch feed passage 160, which is essentially zero, and the pressure acting on the sensor 170, which is sensed at the ECM 58, indicates that the torque-transmitting mechanism 114 is disengaged.

Figure 5:
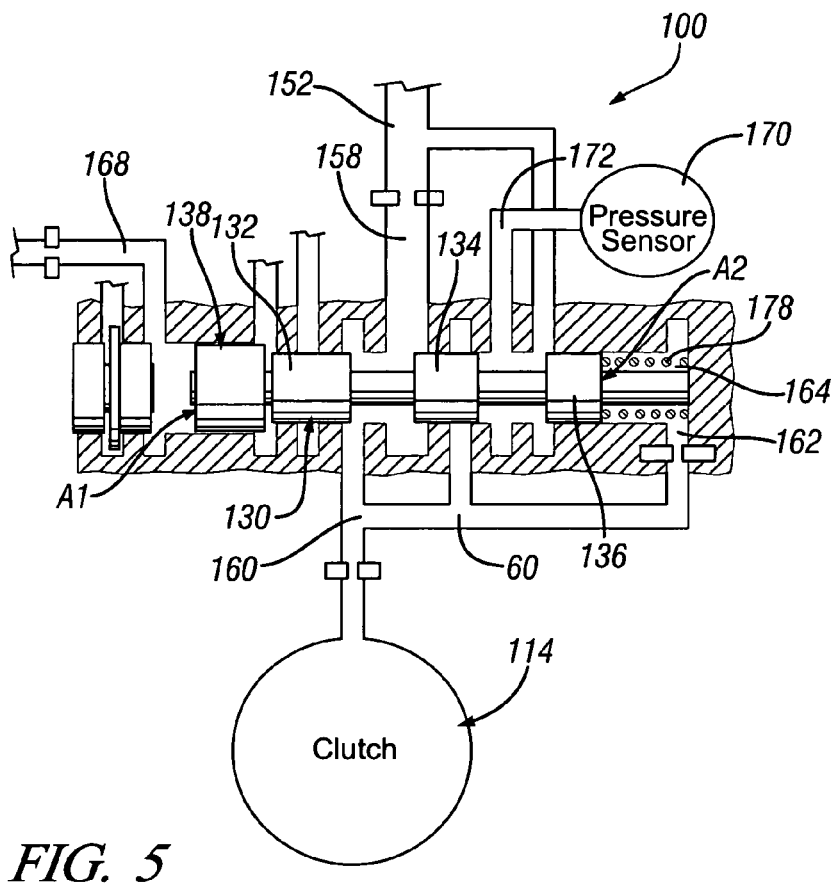
FIG. 5 is a view showing the clutch control apparatus in a filling condition prior to engagement of the piston with the friction plates.

When it is desired to engage the torque-transmitting mechanism 114, the valve spool 130 assumes the position shown in FIG. 5 due to pressure in signal passage 168 acting on the area A1 of the valve land 138. The pressure acting on the valve land 138 causes the valve to move rightward against a return spring 178 to the position shown in FIG. 5. At this point, the pressure in passage 158 is distributed between the valve lands 132 and 134 to the passage 160 such that the filling of the torque-transmitting mechanism 114 begins. The pressure in passage 160 operating through the feedback passage 162 acts on the valve area A2. However, this is not sufficient to overcome the pressure acting on the area A1. Thus, the valve spool 130 assumes the fully stroked position shown.

Figure 6:
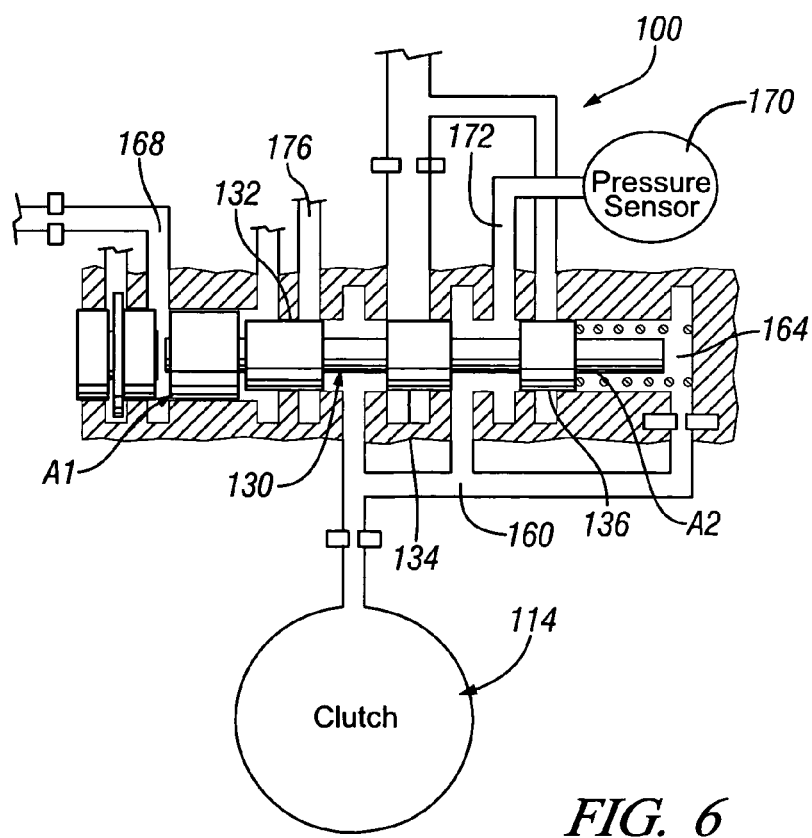
FIG. 6 is a view similar to FIG. 4 showing the clutch control system in a fully applied condition.

At this point, the pressure in passage 152 is distributed between the lands 134 and 136 to the passage 172, which pressurizes the sensor 170, thereby providing a new signal to the ECM 58 indicating that the filling of the torque-transmitting mechanism 114 has begun. When the fill period ends, the return spring (spring 20 in FIG. 1) is compressed permitting the piston to engage the friction plates, the pressure in passage 160 increases to the clutch operating pressure thereby increasing the pressure in the feedback chamber 164 such that the pressure acting on area A2 balances the pressure acting on area A1 and the valve spool 130 moves to the regulating position shown in FIG. 6.

At the regulating point, the pressure in passage 160 is distributed between the valve lands 134 and 136 to the passage 172, which provides a signal pressure at the sensor 170. This sensed pressure is lower than the pressure during the fill operation and therefore the ECM 58 receives a signal indicating that the pressure has decreased and that the end of fill has arrived and that the clutch is fully engaged. It should be noted the difference between the torque-transmitting regulating control systems 10 and 100 is the fact that the feedback sensors, 170 in the system 100 and 54 in system 10, have different control signals.

In the regulating control system 10, the feedback pressure is maximum at the disengaged condition, is essentially zero during the filling operation, and is at a full pressure condition again at the clutch filled condition. Thus, the sensing pressure goes from maximum to minimum to maximum during this operation. In the regulating control system 100, the pressure at the sensor 170 is essentially zero at the idle or unfilled condition, it increases to maximum during the fill condition, and is reduced to an intermediate pressure equal to the clutch pressure at the filled or engaged condition. Thus, the pressure in sensor 170 goes from minimum to maximum to intermediate. In each system, the pressure at the sensor undergoes two changes, one during the fill condition and one during the engaged condition. In the system shown in FIG. 4, the sensor pressure has three distinct levels, thereby indicating to the ECM that the three distinct levels have been attained while in the system shown in FIG. 1, the pressure at the sensor is essentially maximum in both the disengaged and fully engaged condition while it is exhausted or essentially zero during the fill period. Both these systems provide sufficient feedback messages to the ECM 58 to permit the control mechanism to properly operate the transmission and to inform the operator of any malfunction that might occur.

The invention claimed is:

1. A torque-transmitting regulating apparatus including a pressure source and an electronic control module comprising:
   a clutch apply regulating valve apparatus for distributing fluid pressure from a pressure source to a torque-transmitting mechanism to be controlled;
   said torque-transmitting mechanism having a disengaged state, a filling state, and an applied state;
   said electronic control module supplying a signal to said clutch apply regulating valve apparatus to provide a first operating state during which fluid pressure is distributed to a clutch apply chamber during a filling period;
   said clutch apply regulating valve apparatus having associated therewith a pressure sensor for receiving a sensing pressure therefrom and distributing a control signal to said electronic control module at one level during said filling period;
   said clutch apply regulating valve apparatus being positioned in a regulated position following clutch filling to fully engage said torque-transmitting mechanism and supplying said sensing pressure to said electronic control module during said clutch applied state.

2. The torque-transmitting regulating control system defined in claim 1 futher wherein:
   said sensing pressure is high during said disengaged state, low during said filling state, and high during said applied state.

3. The torque-transmifting regulating control system defined in claim 1 further wherein:
   said sensing pressure is low during said disengaged state, high during said filling state, and at an intermediate level during said engaged state.

4. The torque-transmitting regulating control system defined in claim 1, wherein said clutch apply regulating valve apparatus includes a valve body defining a valve bore in fluid communication with a control signal passage, a feed passage, a supply passage, a feedback pressure passage, and a switch pressure passage.

5. The torque-transmitting regulating control system defined in claim 4, wherein said clutch apply regulating valve apparatus further includes a valve spool slidably disposed in said valve bore to transition between at least a disengaged position, a filling position, and a regulating position, said valve spool having first, second, and third lands with a first diameter and a fourth land with a second diameter, wherein said valve spool is urged into said disengaged position by a first biasing member.

6. The torque-transmitting regulating control system defined in claim 5, wherein said torque-transmitting mechanism includes a housing defining an apply chamber, an apply piston slidably disposed in said apply chamber to transition between said disengaged, filling, and applied states, wherein said apply piston is urged into said disengaged state by a second biasing member.

7. The torque-transmitting regulating control system defined in claim 6, wherein said torque-transmitting mechanism further includes a plurality of friction plates drivingly connected with said housing, and a plurality of apply plates interdigitated with said friction plates and drivingly connected with a shaft member.

8. A torque-transmitting regulating and control system including a pressure source and an electronic control module in operative communication with a pressure sensor operable to receive a sensing pressure, comprising:
   a torque-transmitting mechanism including:
      a housing defining an apply chamber;
      an apply piston slidably disposed in said apply chamber to transition between a disengaged state, a filling state, and an applied state, wherein said apply piston is urged into said disengaged state by a first biasing member;
      a plurality of friction plates drivingly connected with said housing; and
      a plurality of apply plates interdigitated with said friction plates and drivingly connected with a shaft member;
   a regulator valve including:
      a valve body defining a valve bore in fluid communication with a control signal passage, a feed passage, a supply passage, a feedback pressure passage, and a switch pressure passage; and
      a valve spool slidably disposed in said valve bore to transition between at least a disengaged position, a filling position, and a regulating position, said valve spool having first, second, and third lands with a first diameter and a fourth land with a second diameter, wherein said valve spool is urged into said disengaged position by a second biasing member;
   wherein said feedback pressure and feed passages are in continuous fluid communication with each other and said torque-transmitting device;
   wherein said signal, supply, and switch pressure passages are in operative communication with the electronic control module;
   wherein said feed, supply, and switch pressure passages are in selective fluid communication with each other; and
   wherein said valve spool is operable when positioned in said regulating position to increase pressure in said pressure switch passage and thereby transmit signals to the pressure sensor indicative thereof.

9. The torque-transmitting regulating and control system of claim 8, wherein said valve spool is operable when in said disengaged and filling position to transmit signals to the pressure sensor indicative thereof.

10. The torque-transmitting regulating and control system of claim 9, wherein said first land has a first area and said fourth land has a second area different from said first area, wherein the pressure acting on the second area balances the pressure acting on said first area when said valve spool moves to said regulating position.

* * * * *